United States Patent
Archetti

(10) Patent No.: US 10,040,027 B2
(45) Date of Patent: Aug. 7, 2018

(54) GRANULE REACTOR FOR TREATING POLLUTING AGENTS PRESENT IN PARTICULATE-CONTAINING INDUSTRIAL GASES, TREATMENT APPARATUS COMPRISING SAID REACTOR AND METHOD OF TREATMENT IMPLEMENTED BY SAID APPARATUS

(71) Applicant: ECOSPRAY TECHNOLOGIES S.R.L., Voghera (IT)

(72) Inventor: Maurizio Archetti, Verscio (CH)

(73) Assignee: Ecospray Technologies S.R.L., Voghera (IT)

( * ) Notice: Subject to any disclaimer, the term of this patent is extended or adjusted under 35 U.S.C. 154(b) by 0 days.

(21) Appl. No.: 15/523,046

(22) PCT Filed: Oct. 29, 2015

(86) PCT No.: PCT/IB2015/058346
§ 371 (c)(1),
(2) Date: Apr. 28, 2017

(87) PCT Pub. No.: WO2016/067236
PCT Pub. Date: May 6, 2016

(65) Prior Publication Data
US 2017/0312686 A1    Nov. 2, 2017

(30) Foreign Application Priority Data
Oct. 29, 2014    (IT) .......................... MI2014A001854

(51) Int. Cl.
*B01D 53/88* (2006.01)
*B01D 53/86* (2006.01)
*B01D 46/00* (2006.01)

(52) U.S. Cl.
CPC ..... *B01D 53/8653* (2013.01); *B01D 46/0068* (2013.01); *B01D 53/885* (2013.01); *B01D 2257/404* (2013.01); *B01D 2257/502* (2013.01); *B01D 2257/702* (2013.01); *B01D 2257/708* (2013.01)

(58) Field of Classification Search
CPC .............. B01D 53/8653; B01D 53/885; B01D 46/0068; B01D 2257/404; B01D 2257/502; B01D 2257/708; B01D 2257/702; B01D 46/0026; B01D 46/0046; B01D 53/82; B01D 2101/00; B01D 2201/02; B01D 2201/0407; B01D 2201/287; B01D 2258/0283; B01D 2275/201

See application file for complete search history.

(56) References Cited

U.S. PATENT DOCUMENTS

| | | | |
|---|---|---|---|
| 3,154,388 A * | 10/1964 | Purse | B01D 53/944 181/276 |
| 3,948,610 A | 4/1976 | Sutcliffe et al. | |
| 4,246,234 A | 1/1981 | Kittrell et al. | |
| 5,874,053 A * | 2/1999 | Chen | B01D 53/8653 422/168 |
| 6,577,828 B1 | 6/2003 | Ramos | |
| 7,074,369 B2 * | 7/2006 | Tabatabaie-Raissi | B01D 53/885 422/169 |
| 8,313,561 B2 * | 11/2012 | Celik | B01D 53/0431 95/96 |
| 2013/0312329 A1 | 11/2013 | Nixdorf | |

FOREIGN PATENT DOCUMENTS

| | | | |
|---|---|---|---|
| EP | 0501281 A2 | 9/1992 | |
| EP | 0510420 A1 | 10/1992 | |
| GB | 523146 A * | 7/1940 | ............. B01D 53/16 |
| WO | 94/21351 A1 | 9/1994 | |
| WO | 99/10633 A1 | 3/1999 | |

OTHER PUBLICATIONS

PCT International Search Report and Written Opinion corresponding to PCT/IB32015/058346, dated Feb. 9, 2016.

\* cited by examiner

*Primary Examiner* — Timothy C Vanoy
(74) *Attorney, Agent, or Firm* — LeClairRyan PLLC

(57) ABSTRACT

A granule reactor (10), an apparatus comprising said reactor and a method implemented by said apparatus are described for treating polluting agents present in industrial gases, particularly but not only, when such gases comprise $NO_x$, volatile organic compounds (VOCs), carbon monoxide (CO), hydrocarbons and similar pollutants. The pellet reactor is adapted to be used in the treatment of industrial gases, capable of treating industrial gases and removing particulate from said gases while maintaining a constant efficiency. Moreover, a method of treating the polluting agents present in industrial gases by means of said pellet reactor, and a pellet reactor adapted to implement said method of treatment are described.

17 Claims, 3 Drawing Sheets

ID REACTOR FOR TREATING
POLLUTING AGENTS PRESENT IN
PARTICULATE-CONTAINING INDUSTRIAL
GASES, TREATMENT APPARATUS
COMPRISING SAID REACTOR AND
METHOD OF TREATMENT IMPLEMENTED
BY SAID APPARATUS

This application is a national stage application under 35 U.S.C. § 371 of PCT Application No. PCT/IB2015/058346, filed Oct. 29, 2015, which claims the priority benefit of Italy Application No. MI2014A001854, filed Oct. 29, 2014, which is hereby incorporated by reference in its entirety.

FIELD OF THE INVENTION

The present invention relates to a granule reactor, an apparatus comprising said reactor and a method implemented by said apparatus, for treating polluting agents present in industrial gases, particularly but not only, when such gases comprise $NO_x$, volatile organic compounds (VOCs), carbon monoxide (CO), hydrocarbons and similar pollutants.

The granule reactor, the apparatus comprising said reactor and the treatment method implemented by said apparatus are particularly effective in industrial plants of cement production, electricity production, boilers, but obviously the present invention is not limited to these applications.

BACKGROUND ART

Granules reactors, or pellet reactors according to the terminology consolidated in the related field, are known in the prior art, which precisely use granules referred to as pellets which comprise a bed of material having catalyst properties for chemical oxidation reactions normally occurring in a catalytic converter.

In particular, such pellet reactors are used in industrial plants for treating industrial gases before they are released into the atmosphere.

Even more in particular, said pellet reactors are used for treating industrial gases (often combustion gases) rich in polluting agents, such as $NO_x$, volatile organic compounds (VOCs), carbon monoxide (CO), unburned hydrocarbons and similar pollutants. The efficiency of such pellet reactors is very high from the point of view of the chemical reduction of pollutants, however they have the drawback, still unsolved, that they tend to become clogged quickly due to the particulate, i.e. powders, present in the gas itself and which tend to accumulate on the pellets and between one granule and the other.

Therefore, at present, pellet reactors are not extensively used because their efficiency is impaired and quickly declines due to clogging of the reactor itself due to the powders/particulate present in the gas.

SUMMARY OF THE INVENTION

Therefore, it is the main task of the present invention to provide a pellet reactor of different shape and size, suitable for being used for treating polluting agents present in combustion gases, particularly but not only, when such gases comprise $NO_x$, volatile organic compounds (VOCs), carbon monoxide (CO), hydrocarbons and similar pollutants.

In particular, within said task, it is an object of the present invention to provide a pellet reactor adapted to be used in the treatment of industrial gases, while being capable of treating the industrial gases and removing particulate from said gases while maintaining a constant efficiency despite the presence of particulate in the gas.

It is yet another object of the present invention to provide a method of treating the polluting agents present in industrial gases involving the use of a pellet reactor according to the present invention which allows the efficiency of treatment to be kept constant over time despite the presence of particulate in the gas.

It is also an object of the present invention to provide a pellet reactor suitable for carrying out a treatment of the polluting agents present in industrial gases and the simultaneous removal of particulate.

It is yet another object of the present invention to provide a much more efficient pellet reactor compared to the honeycomb catalytic converters of the traditional type used under conditions of particulate-rich gases, being able to carry out $DeNO_x$ reactions already at temperatures below 200° C., even at temperatures close to 160° C.

Even more in particular, these tasks and objects are achieved by a pellet reactor having a tubular structure with a predominant axial development, comprising a wall defining an axial cavity, said wall in turn comprising a first net or mesh outer wall and a second net or mesh inner wall, so that said wall has a layer of pellets sandwiched between said two inner and outer walls.

The sandwich structure of the wall ensures that the granules remain stably enclosed in the wall structure, so that the counter-current washing of said pellet bed performed with compressed air in counter-current by the washing means suitably provided on said reactor does not result in the displacement of the granules from their original arrangement.

Preferably, said granules or pellets are of the type marketed by CRI Catalyst Company, Johnson Mattey or other companies.

Said reactor is further characterized in that it has a preferably conical structure with dimensional ratios between the outlet diameter and the inlet diameter of the counter-current washing flow of 1:5.

BRIEF DESCRIPTION OF THE DRAWINGS

Further features and advantages of the present invention will become more apparent from the following detailed description, given by way of a non-limiting example and shown in the accompanying drawings, in which.

DETAILED DESCRIPTION OF THE INVENTION

Figure 1:
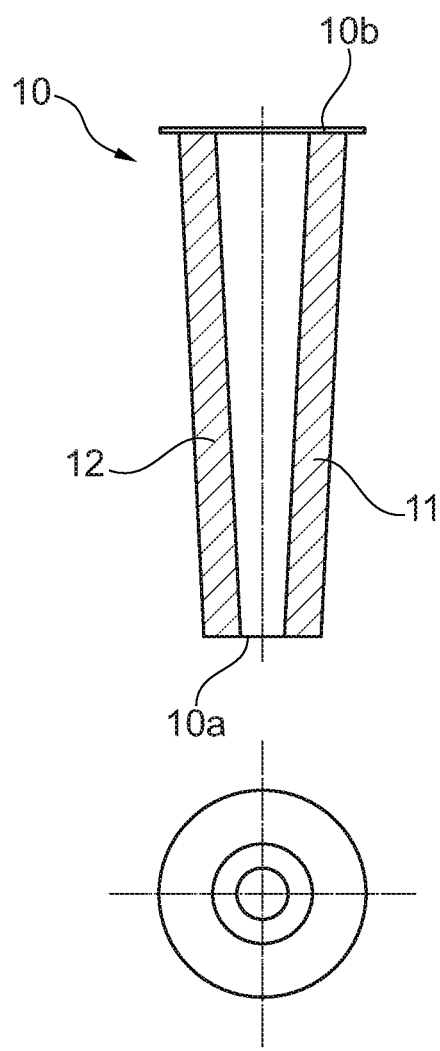
FIG. 1 shows a diagrammatic sectional view with a longitudinal plane of the pellet reactor according to the present invention.

According to a preferred embodiment of the present invention shown in said FIG. 1 by way of a non-limiting example, said pellet reactor is generally indicated by the reference numeral 10.

The reactor 10 according to the present invention comprises a layer of catalyst granules, or catalyst pellets, of different size and shape.

In the reactor 10 according to the present invention, catalyst granules may be used for the elimination of carbon monoxide (CO) or for the selective catalytic reduction (SCR) of nitrogen oxides ($NO_x$), for the reduction of volatile organic compounds (VOC) and unburned hydrocarbons (HC).

If focusing on a particular chemical reaction is desired, the reactor may have only one type or predominantly only one type of catalyst granules. Instead, if multiple chemical reactions are to be induced, more different types of catalyst granules suitably mixed in a composition, preferably but not necessarily homogeneous, may be provided.

The reactor 10 according to the present invention preferably has a structure with predominantly longitudinal development, preferably cylindrical, even more preferably slightly conical, and having an axial cavity.

With reference to FIG. 1, said reactor 10 has a substantially tubular structure comprising a wall 11 defining an axial cavity 12.

The reactor is substantially hollow and cylindrical in shape. More preferably, it is conical with a substantially constant wall thickness 11.

On a transverse plane, therefore, said reactor has a toroidal section.

Said wall 11 comprises a plurality of catalyst granules or pellets.

In order to retain said granules or pellets, which can have different shapes and sizes depending on the manufacturer, the wall 11 of said reactor 10 preferably comprises a first mesh or net outer wall 11a made of metal material, preferably stainless steel or other suitable material, and a second mesh or net inner wall 11b, so that said wall 11 will have a sandwiched structure comprising a first pierced outer wall 11a, a layer of pellets 11c, and a second inner wall 11b.

Each of said first outer wall 11a and said second inner wall 11b of said wall 11 will have meshes compatible with the granule size, so that the wall can simultaneously retain said catalyst granules in place in a stable manner and allow the air to pass through the wall 11 itself.

Advantageously, said reactor 10 is substantially conical in shape.

With particular reference to such a preferred embodiment of the reactor according to the present invention, which is characterized by a conical shape, it will have a first end 10a having a first diameter, and a second end 10b having a second diameter, the dimensional ratio between said first diameter and said second diameter being preferably 1:2, more preferably 1:3 or 1:4, even more preferably 1:5 or 1:6.

As an example of the actual size which could be taken by the reactor according to the present invention, said first diameter of said first end 10a can advantageously be 50 mm, while said second diameter of said second end 10b can advantageously be 250 mm.

The granule or pellet wall 11 may instead have a thickness from 50 to 200 mm. Such measures are given by way of mere non-limiting example of the preferred thickness of the bed of pellets.

Similarly, by way of example, it may be said that the outer 11a and inner 11b containment walls are made of metal sheet with thicknesses of about 1 or 2 mm and slotted holes with a width of about 2 mm and a length of 20 mm.

Figure 2:
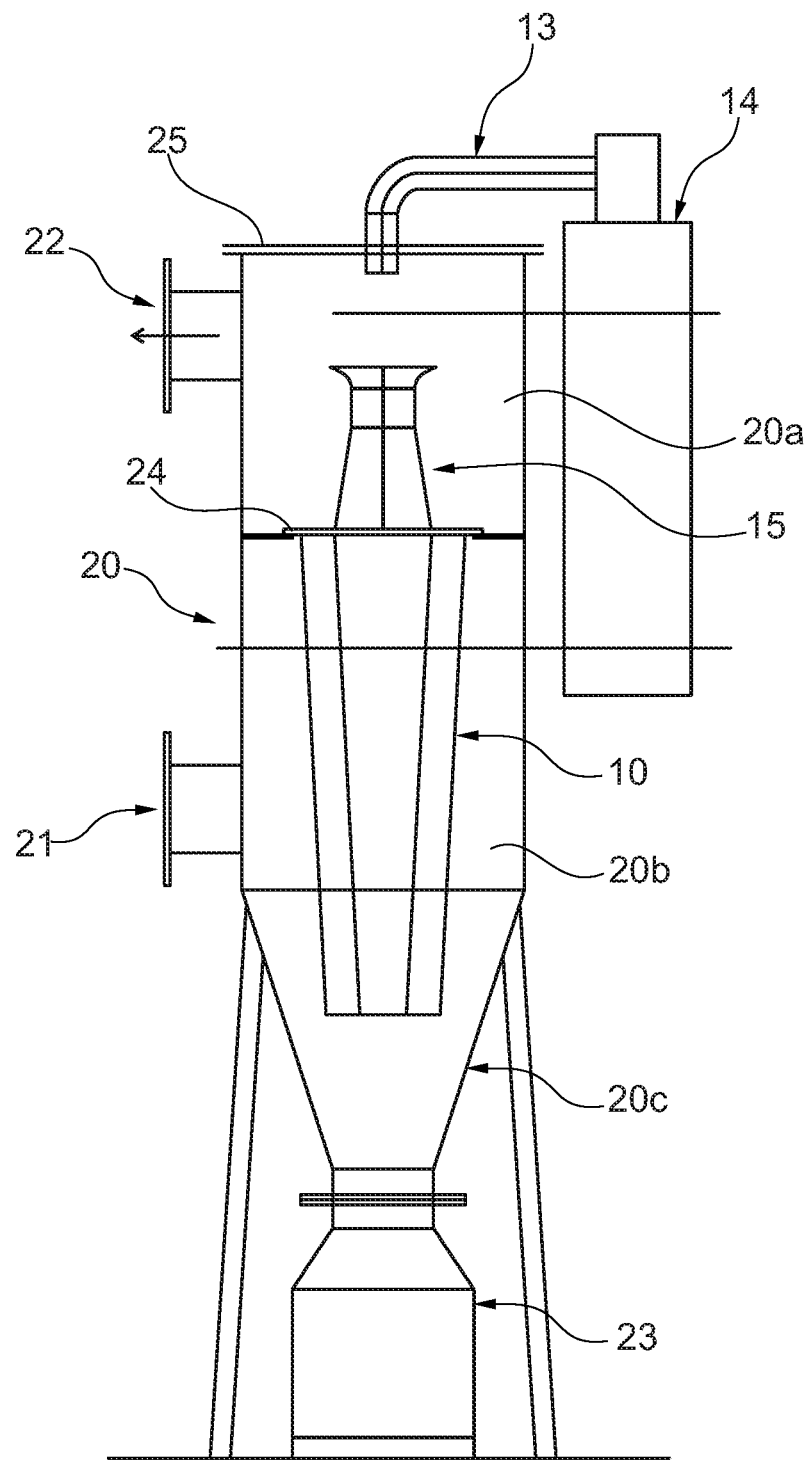
FIG. 2 shows a diagram of an apparatus for treating industrial gases which comprises a treatment module in turn comprising a pellet reactor according to the present invention.

With particular reference to FIG. 2, the reactor 10 according to the present invention as described so far can be installed in an industrial plant, in particular within the module of treatment of the exhaust gases of a cement plant or of an energy production plant.

The apparatus for treating gases according to the present invention comprises a module in turn comprising a cylindrical body 20 arranged substantially vertically above the ground, in which the gas to be treated is introduced through a tangential inlet duct 21.

The gases enter into the cylindrical body 20 through the inlet duct 21 according to a tangential direction and are sucked outwards by suction means, such as a fan, provided at an outlet duct 22 and not shown in the figure.

A partition 24 separates the lower zone of said cylindrical body 20 from the upper zone, forming two separate chambers, a lower chamber 20b and an upper chamber 20a. Said outlet duct 22 is in fluid communication with said upper chamber 20a so that the gas is sucked from said upper chamber, while said inlet duct 21 is in fluid communication with said lower chamber 20b.

Said granule reactor 10 is arranged with said first end 10a in fluid communication with said lower chamber 20b and said second end 10b in fluid communication with said upper chamber 20a.

Therefore, the operation of the apparatus according to the present invention is as follows.

The gases to be treated enter into the treatment module through the tangential or centered inlet duct 21. In particular, they enter into the lower chamber 20b of the cylindrical body 20 of said gas treatment module.

At the same time, suction means are connected to the outlet duct 22, which is in fluid communication with the upper chamber 20a.

The gases to be treated entering from said inlet duct 21, in case of tangential inlet, are cycloned within the lower chamber 20b. In the helical motion, part of the powders present in the gas is pre-separated and accumulated in tank 23 so as to reduce the load of particulate entering into the catalyst bed. The suction means connected to said upper chamber 20a create a depression which sucks air not only through the axial cavity 12 of said reactor 10, but also through the wall 11 of said reactor.

In fact, the wall 11 of said reactor has a sandwich structure comprising a first outer wall 11a and a second inner wall 11b, each having a pierced or mesh structure, preferably of stainless steel, with meshes or holes having gaps compatible with the size of the granules of layer 11c, thus the wall is simultaneously able to retain the catalyst granules in place in a stable manner and allow the gases to be treated to pass through the wall 11 itself.

At the same time, the powders contained in the gases tend to settle on the granules or pellets of said reactor 10 thus causing a quick clogging of the filter itself.

In order to obviate this drawback, the apparatus according to the present invention provides means 13, 14 for countercurrent washing said reactor 10.

The suction means connected to the upper chamber 20a draw the gases which are cycloning in the lower chamber 20b, thus forcing the gases to pass through the wall 11 of said reactor.

The gases flowing through the catalyst bed are thus treated, reducing the pollutants due to the catalytic properties of the granules contained in the layer 11c of said wall 11.

A Venturi ejector 15 is placed at said second end 10b of said reactor 10, is substantially cylindrical or conical in shape, and is positioned so as to form a sort of extension of the axial cavity 12 of said reactor 10.

More in particular, said upper chamber 20a is closed at the top by a second partition 25 which allows said washing means to face into said upper chamber, in particular a washing compressed air duct 13 which is axially aligned with said Venturi ejector 15 and with the axis of said axial cavity 12 of said reactor 10, which is substantially cylindrical or conical in shape, as said, with a predominantly axial development.

Said air duct 13 preferably comprises a Venturi ejector which draws further gas into the reactor due to the compressed air pulse, thus increasing the counter-washing rate.

Said washing means further comprise a compressed air source 14 in fluid communication with said air duct 13.

The tangential inlet of gases in the cylindrical body 20 ensures, as mentioned, that the gases inside the cylindrical body 20 itself start cycloning, i.e. moving according to a cyclone motion. While the gas is cycloning inside the cylindrical body, a part of the powders settles against the inner wall of the cylindrical body 20 due to the centrifugal force, and then falls by gravity into hopper 23. Already in this initial pre-separation step, the powder content in the gases is partly reduced.

However, especially when a large amount of powder is present in the gases, after some hours of operation the catalytic reactor 10 loses efficiency due to the excessive settling of the powders contained in the treated gases on the wall 11 of said reactor, a flow rate of compressed air is introduced in said axial cavity 12, preferably through said collar 15 and preferably in the form of compressed air pulses lasting 0.3-0.5 seconds, by means of the air duct 13.

The counter-current washing can also be carried out with the apparatus running.

Advantageously, a series of modules for treating exhaust gases as described so far can be arranged in parallel to the flow of gases to be treated, and counter-current washing can also affect only one module at a time.

Figure 3:
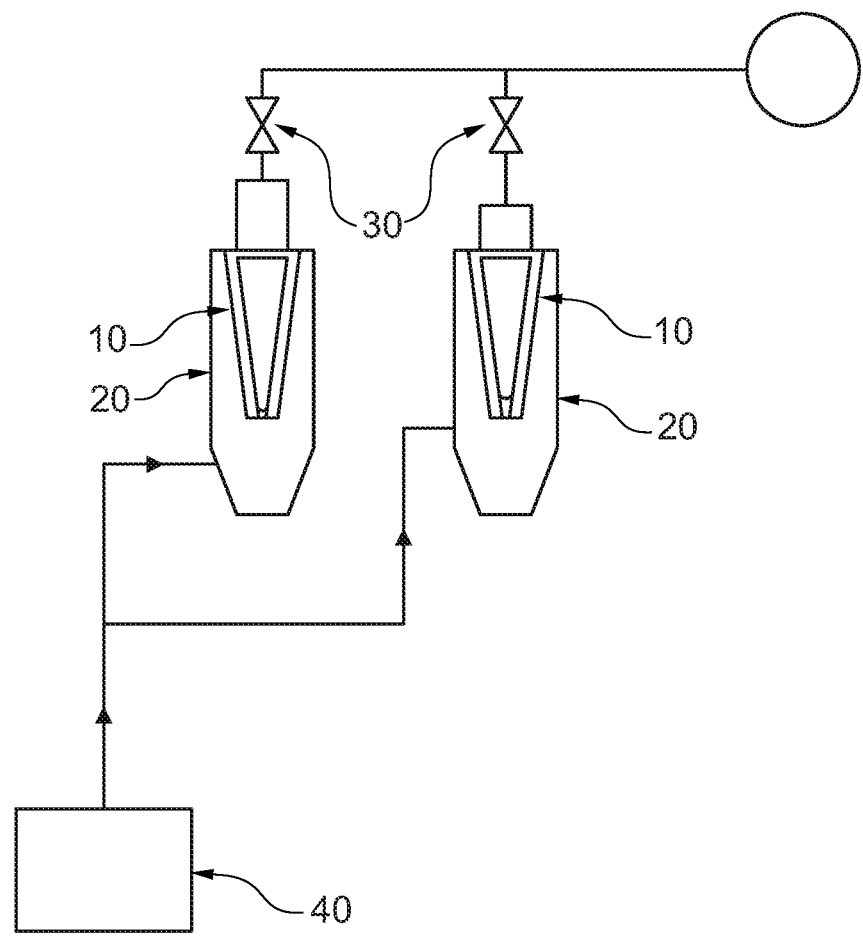
FIG. 3 shows an alternative embodiment of the apparatus according to the present invention comprising several modules comprising each a pellet reactor according to the present invention.

In addition to multiple modules arranged in parallel, even multiple reactors 10 individually excludable with dedicated valves 30 may be arranged in parallel to facilitate the operation of washing, as shown in FIG. 3.

A single reactor may be isolated from the gas by closing valve 30 associated therewith and the single elements may be washed in series with jets of compressed air. Thereby, the single modules can be washed more efficiently. Due to the reactor being isolated from gas, when washing in series the modules, the powder which is removed from an element cannot reach (although to a lesser extent) the chimney with concentrated powder emissions.

The compressed air flow in counter-current removes the powders deposited on said wall 11 of said reactor 10, and they fall down, conveyed to a tapered portion 20c of said cylindrical body 20 and collected in a hopper 23.

According to the preferred embodiment shown in the accompanying figures, the granule reactor according to the present invention preferably is conical in shape.

The conical shape has two advantages: on the one hand, during washing using compressed air in counter-current, the flow rate distribution along the reactor is optimized by the conical shape, since the smaller amount of gas which reaches the reactor points closer to said first lower end 10 of the reactor is balanced by a smaller diameter of the cross-section of said axial cavity 12, so as to optimize the operation of washing; similarly, when the gas to be treated is sucked within said reactor through the depression caused by said suction means, the gas farther from said suction means, i.e. the gas closer to said first end 10a of said reactor, will have a lower speed than the gas closer to the suction means. Since in the presence of powders in the gases, the upward speeds of the gas itself must not fall below a certain value to prevent the powders from settling, with the negative effect of clogging the reactor, the downwards tapered conical shape, i.e. towards said first end 10a, of said reactor helps to accelerate the gas flow close to said first end 10a.

As said, the present invention also relates to the gas treatment method implemented by the apparatus described so far.

More in particular, the apparatus according to the present invention comprises a cylindrical body 20 comprising a tangential inlet duct 21 and an outlet duct 22 to which gas suction means are connected in fluid communication, and a reactor 10 according to the present invention.

The method thus includes introducing gas into said cylindrical body 20 through said inlet duct 21 in order to cyclone the gas inside said cylindrical body 20 so that said powders are deposited on the inner wall of said cylindrical body 20 in a powder pre-separation step.

The gases are then sucked by means of said suction means in communication with said outlet duct 22, thus forcing said gases to pass through said granule reactor 10.

The method then includes washing said granule reactor 10 from the powders by means of compressed air pulses investing said reactor in counter-current with respect to the flow of gas to be treated.

Advantageously, said method may comprise the further step of collecting the powder discharged by washing in counter-current in a hopper 23.

Therefore, the reactor, apparatus and method according to the present invention achieve the task and the objects that the invention intends to accomplish, in particular being adapted to be used for treating powder-rich gases.

The reactor according to the present invention can advantageously be used in a gas treatment apparatus adapted to be installed within an exhaust gas treatment module of a cement plant.

In addition to the technical advantages already disclosed, it should be also noted that the granule reactor and the apparatus described so far allow $DeNO_x$ to be carried out at temperatures below 200° C., even at temperatures of about 160° C., even with average and moderate levels of powders in the gases to be treated. When large amounts of $SO_2$ and/or $SO_3$ are present in the gases, $DeNO_x$ cannot usually be carried out at temperatures below 300° C. since, before reaching the catalyst, the reagent which is used in the $DeNO_x$ reaction, typically consisting of urea or ammonia, reacts with $SO_2/SO_3$, thus forming ammonium sulphate and/or bisulphate.

These components (of sticky and stable texture) settle on the catalyst, thus reducing the yield thereof since they prevent the gases to be treated from coming directly in contact with the catalysts.

The high efficiency of the compressed air washing operation described herein allows a better resistance to clogging by these substances.

A further variant of the system with reactors placed in parallel and isolated by valves 30 placed at the inlet and/or outlet of the reactor also allows the injection, in the single reactor isolated from the gas flow, by means of hot gas injection means for the co-current or counter-current regeneration of said reactor, of a small flow rate of gas (e.g. air) at high temperature directly tapped from a boiler 40 or especially generated. The hot gas raises the temperature of the granules above 350° C. Under these conditions, the compressed air washing allows the complete detachment of the accumulated substances, thus completely regenerating the catalysts.

Those skilled in the art could make several changes without departing from the scope of protection of the present invention. Therefore, the protection scope of the claims should not be limited by the disclosures or by the preferred embodiments shown in the description by way of example, but rather the claims must encompass all the features of patentable novelty which can be inferred from the present invention, including all the features treated as equivalent by those skilled in the art.

The invention claimed is:

1. A catalyst granule or pellet reactor, comprising a tubular structure with a predominant axial development, the tubular structure comprising a wall defining an axial cavity, the wall comprising a first net or mesh outer wall and a second net or mesh inner wall, the wall having a layer of pellets sandwiched between the inner wall and the outer wall, wherein the reactor has a conical structure.

2. The reactor according to claim 1, wherein the first outer wall and the second inner wall respectively have meshes compatible with the granule size, so that the wall can at the same time stably retain the catalyst granules and allow the air passage through the wall.

3. The reactor according to claim 1, wherein the conically structured reactor comprises a first end having a first diameter and a second end having a second diameter, wherein a dimensional ratio between the first diameter and the second diameter is between 1:2 and 1:6.

4. The reactor according to claim 3, wherein the dimensional ratio between the first diameter and the second diameter is between 1:3 and 1:5.

5. The reactor according to claim 3, wherein the dimensional ratio between the first diameter and the second diameter is 1:5.

6. An apparatus for treating particulate-comprising gas, comprising:
a cylindrical body, the cylindrical body comprising a tangential inlet duct through which the gas to be treated is introduced in the cylindrical body; and
a reactor having a tubular structure with a predominant axial development, comprising a wall defining an axial cavity, the wall comprising a first net or mesh outer wall and a second net or mesh inner wall, so that the wall has a layer of pellets sandwiched between the inner wall and the outer wall, wherein the reactor has a conical structure.

7. The apparatus according to claim 6, wherein the cylindrical body comprises an outlet duct and a suction device in fluid communication with the outlet duct.

8. The apparatus according to claim 7 further comprising:
a partition separating a first zone of the cylindrical body from a second zone forming a first chamber and a second chamber located above the first chamber during use, wherein the outlet duct is in fluid communication with the second chamber, and the inlet conduit is in fluid communication with the first chamber.

9. The apparatus according to claim 8, wherein the reactor is arranged with a first end in fluid communication with the first chamber and a second end in fluid communication with the second chamber.

10. The apparatus according claim 9, further comprising a counter-current washing device for the reactor.

11. The apparatus according to claim 10, wherein the counter-current washing device comprises an air duct, axially aligned with the axis of the axial cavity of the reactor, and a source of compressed air in fluid communication with the air duct.

12. The apparatus according to claim 11, wherein the counter-current washing device further comprises a Venturi ejector.

13. The apparatus according to claim 12, further comprising a plurality of reactors arranged in parallel with respect to the gas flow to be treated, each of the reactors being provided with a gas intercepting valve in order to exclude one or more reactors from the gas flow to be treated.

14. The apparatus according to claim 13, further comprising an injection device for injecting hot gases for co-current or counter-current regeneration of the reactor.

15. A method for treating polluting agents in particulate-containing gas comprising:
providing an apparatus comprising:
a cylindrical body equipped with a tangential inlet duct;
a catalyst granule reactor having a tubular structure with a predominant axial development, comprising a wall defining an axial cavity, the wall comprising a first net or mesh outer wall and a second net or mesh inner wall, so that the wall has a layer of pellets sandwiched between the inner wall and the outer wall, wherein the reactor has a conical structure; and
an outlet duct connected, in fluid communication, to gas suction device;
introducing gas into the cylindrical body through the tangential inlet duct in order to cyclone the gas inside the cylindrical body so that powders are deposited on an inner wall of the cylindrical body in a powder pre-separation step;
aspirating the gas by the gas suction device in fluid communication with the outlet duct to force the gas to pass through the granule reactor;
washing the granule reactor from the powders using pulses of compressed air investing the reactor in a counter-current to the flow of gas to be treated.

16. The method according to claim 15, further comprising:
collecting, in a hopper, dust discharged by the counter-current washing.

17. The method according to claim 16, further comprising:
providing a plurality of the reactors, arranged in parallel with respect to the gas flow to be treated, each comprising at least an intercepting valve to exclude the reactor from the gas flow to be treated;
selectively excluding one or more of the reactors from the gas flow to be treated by operating the valve;
investing the one or more or reactors excluded from the gas flow to be treated with a small current or counter-current flow rate of hot gas at a temperature sufficient to obtain the thermal regeneration of catalyst granules.

* * * * *